United States Patent
Drury et al.

(10) Patent No.: US 12,174,713 B2
(45) Date of Patent: *Dec. 24, 2024

(54) CEPH FAILURE AND VERIFICATION

(71) Applicant: SOFTIRON LIMITED, Chilworth (GB)

(72) Inventors: Robert Drury, Louth (GB); Stephen Hardwick, Austin, TX (US)

(73) Assignee: SOFTIRON LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,561

(22) Filed: Oct. 4, 2022

(65) Prior Publication Data

US 2023/0108213 A1    Apr. 6, 2023

Related U.S. Application Data

(60) Provisional application No. 63/252,352, filed on Oct. 5, 2021.

(51) Int. Cl.
*G06F 11/00* (2006.01)
*G06F 11/20* (2006.01)
*G06F 11/30* (2006.01)
*G06F 11/34* (2006.01)
*H04L 49/20* (2022.01)

(52) U.S. Cl.
CPC ........ *G06F 11/2023* (2013.01); *G06F 11/302* (2013.01); *G06F 11/3034* (2013.01); *G06F 11/3447* (2013.01); *G06F 11/3466* (2013.01); *H04L 49/205* (2013.01)

(58) Field of Classification Search
CPC ............... G06F 11/2023; G06F 11/302; G06F 11/3034; G06F 11/3447; G06F 11/3466
See application file for complete search history.

(56) References Cited

U.S. PATENT DOCUMENTS

| | | | | |
|---|---|---|---|---|
| 7,971,093 | B1 * | 6/2011 | Goel | G06F 11/0793 714/6.22 |
| 9,766,980 | B1 * | 9/2017 | Anantharaman | G06F 11/1076 |
| 2006/0010352 | A1 * | 1/2006 | Mukherjee | G06F 11/0775 714/E11.026 |
| 2009/0122434 | A1 | 5/2009 | Amemiya | 360/46 |
| 2017/0010931 | A1 | 1/2017 | Agarwal et al. | 714/54 |

(Continued)

FOREIGN PATENT DOCUMENTS

CN  113704220 A  * 11/2021
WO  WO-2021129367 A1 *  7/2021 ......... H04L 41/0609

OTHER PUBLICATIONS

International Search Report and Written Opinion, Application No. PCT/EP2022/077737, 14 pages, Feb. 3, 2023.

*Primary Examiner* — Elmira Mehrmanesh
(74) *Attorney, Agent, or Firm* — Slayden Grubert Beard PLLC

(57) ABSTRACT

A media failure server includes a processor, and a non-transitory machine-readable medium including instructions. The instructions, when loaded and executed by the processor, cause the processor to aggregate software defined storage (SDS) performance data from a plurality of media servers, process the aggregated SDS performance data, and determine whether the aggregate SDS performance data indicates that a first media server includes a potentially failing storage medium.

18 Claims, 7 Drawing Sheets

(56) References Cited

U.S. PATENT DOCUMENTS

| | | | |
|---|---|---|---|
| 2017/0090779 A1* | 3/2017 | Barzik | G06F 3/065 |
| 2018/0061335 A1* | 3/2018 | Fujita | G09G 3/3688 |
| 2018/0081571 A1* | 3/2018 | Akshara | G06F 3/0653 |
| 2020/0089572 A1* | 3/2020 | Bodner | G06F 11/2284 |
| 2021/0112009 A1* | 4/2021 | Takashige | H04L 41/0213 |
| 2021/0182137 A1 | 6/2021 | Nayak et al. | |
| 2022/0413950 A1* | 12/2022 | Ott | G06F 11/26 |
| 2023/0136274 A1* | 5/2023 | Bruno | H04L 49/205 |
| | | | 711/154 |

* cited by examiner

CEPH FAILURE AND VERIFICATION

PRIORITY

The present application claims priority to U.S. Provisional Application No. 63/252,352 filed Oct. 5, 2021, the contents of which are hereby incorporated in their entirety.

FIELD OF THE INVENTION

The present disclosure relates to the management of computer servers and, in serial communications and, more particularly, to detection and verification of software defined storage (SDS) such as Ceph and Ceph media.

BACKGROUND

As the amount of data is constantly increasing, so is the need to utilize larger storage media devices. Consequently, storage media device failure has a greater impact as storage media devices become larger. To that end storage media device performance and monitoring data such as Self-Monitoring, Analysis and Reporting Technology (often written SMART) was developed to provide information used to predict drive failure. Many solutions use media performance and monitoring data alone to predict and remediate media failure.

Embodiments of the present disclosure may further utilize user data to aid in media failure predictions. In the case of SDS, system performance, checksums, error coding, or erasure coding errors can be used as a predictive factor. Using this predictive analysis, verification can be conducted based on the potential failure of a storage media device.

In some cases, the predictions may generate false positives, wherein storage media devices are identified as potentially failing but that may not be the case. Using advanced testing with dynamic configuration, the positive results can be evaluated and, if necessary, requalified.

Embodiments of the present disclosure address one or more of these issues.

DETAILED DESCRIPTION

Figure 1:
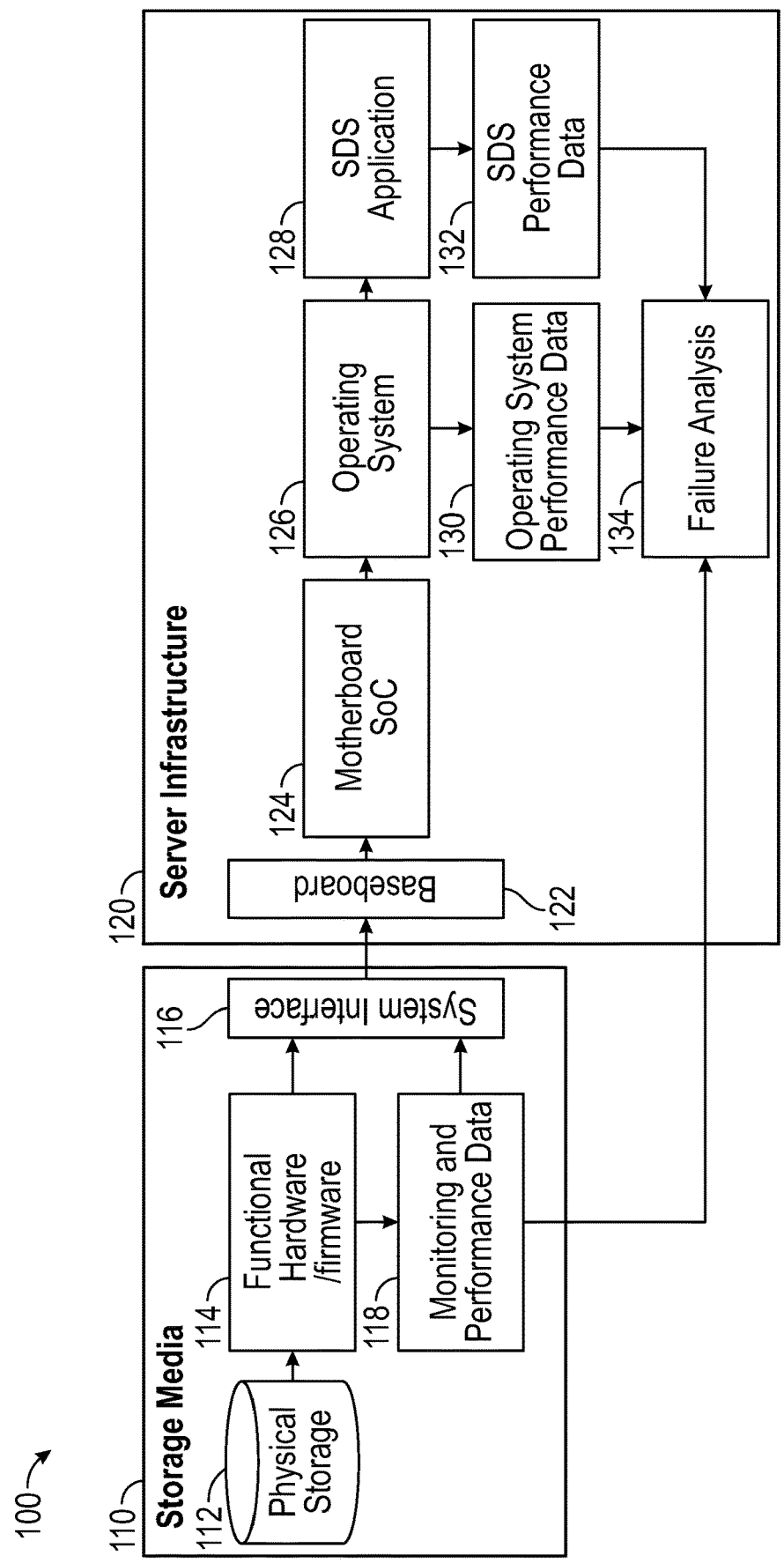
FIG. 1 is an illustration of an example of the high-level construction of a storage media server, according to embodiments of the present disclosure.

FIG. 1 is an illustration of an example of the high-level construction of a storage media server 100, according to embodiments of the present disclosure.

Server 100 may include storage media 110 and server infrastructure 120. From a general perspective, storage media 110 may contain a physical storage 112 component and functional hardware and firmware 114 that allow storage media 110 to provide storage capability. In addition, monitoring and performance data 118 may provide performance information about the operation of storage media. A system interface 116 may allow storage media 110 to communicate to server infrastructure 120.

Server infrastructure 120 may include any suitable number and kind of elements, some of which are shown. Server infrastructure 120 may include a System on a Chip (SOC) 124. A baseboard 122 may connect multiple storage media 110 devices, although only one is shown for clarity. SOC 124 may have an associated operating system 126 that may allow various applications to be executed. Once such application is an SDS application 128 such as Ceph. Operating system 126 may also generate operating system performance data 130. Similarly, SDS application 128 may also produce SDS performance data 132. In both cases, this may include items such as data throughput, computational execution times, system errors, and data errors.

The performance data can be used to provide predictive models to determine if a given storage media device has a potential to fail. FIG. 1 shows three potential sources for the performance data—monitoring and media monitoring and performance data 118, operating system performance data 130, and SDS performance data 132. The data can be used individually or in combination to provide different models for different purposes. The data may be analyzed by, for example, failure analysis 134.

The goal of the error analysis by failure analysis 134 may be to predict the potential failure of a storage media device 110 before catastrophic failure actually occurs in the device. If this prediction achieved, then the instance of storage media device 110 that is predicted to fail can be identified and removed from service prior to catastrophic failure. This may be especially true in SDS where information may be stored across multiple media devices. Further, SDS applications 128 may be designed to randomly and evenly distribute user data across multiple storage devices 110. Once an instance of storage media device 110 has been identified as predicted to fail, then that storage media device 110 can be flagged for replacement. This may involve gracefully removing it from its SDS operating environment, in that it is removed from a system of SDS servers without causing needless accumulation of processing or storage load on other server assets. However, by using verification of identified errors, false positives can be detected and prevent the unnecessary removal of a functional storage media device.

Use of SDS may include mechanisms that collect SDS performance data. This can include, for example, user data transfer statistics and data integrity errors. In the case of transfer statistics, an error can be determined if the measured performance is outside of a given performance threshold, such as a slow data transfer of a given transfer or an unacceptably long data queue. Data integrity errors can be used as a detection mechanism. The errors may include, for example, checksums or hash codes of data blocks. These errors as well as data that does not conform to expected values, such as previously written values, may indicate a problem on the underlying physical media. Forward error correcting mechanisms or erasure codes, such as Reed-Solomon encoding, may be used to process the user data when it is written, and to detect errors in the returned data. However, in many media servers performance variance could be attributable to any interface circuitry used to transfer the data to or from the storage media device. Thus, embodiments of the present disclosure may use analytical methods to extract the performance data for both the storage media devices alone, such as media monitoring and performance data and operating system metrics.

Figure 2:
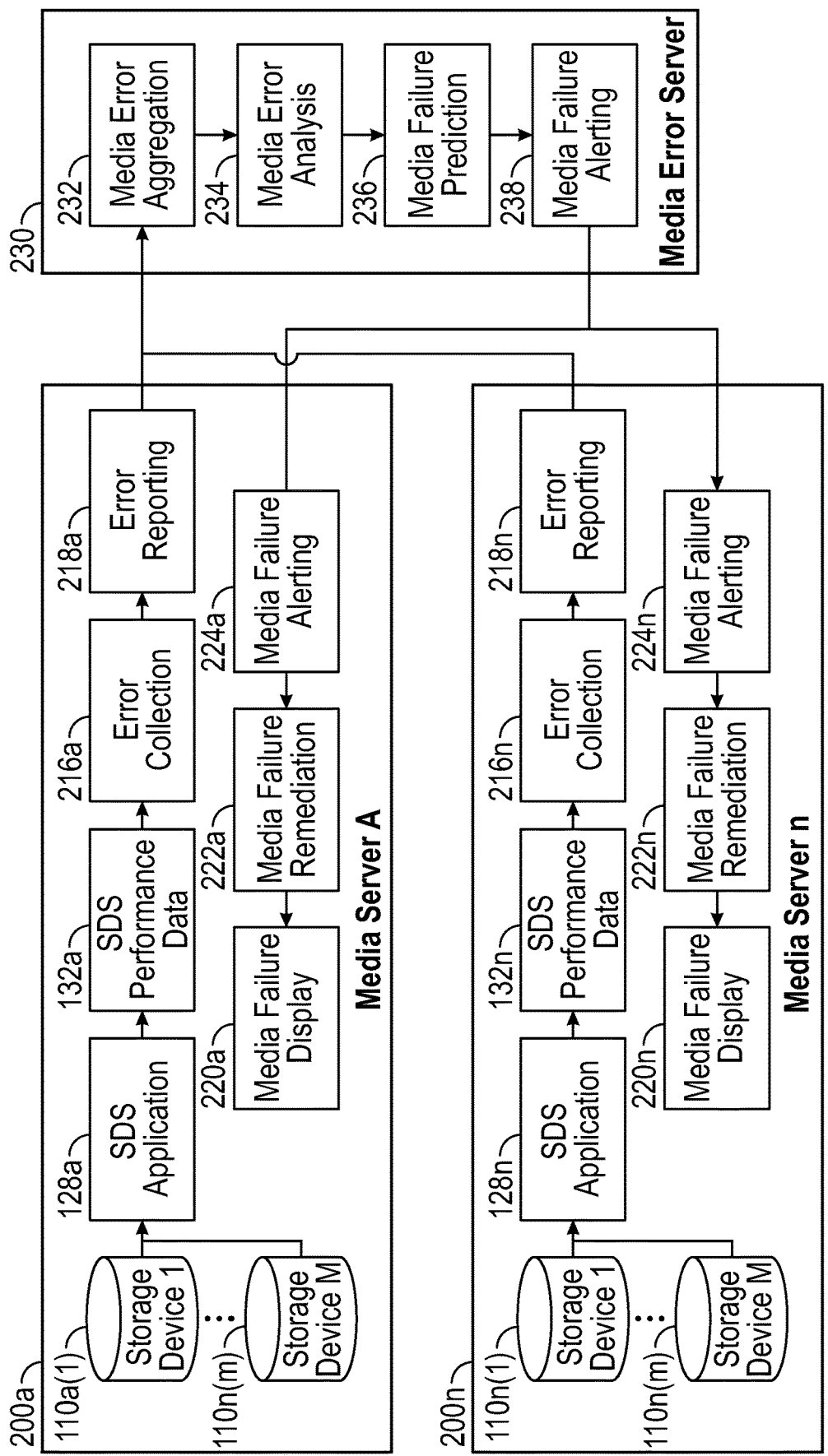
FIG. 2 is an illustration of an exemplary system architecture for an error collection system for potential failure of media devices, according to embodiments of the present disclosure.

FIG. 2 is an illustration of an exemplary system architecture for an error collection system for potential failure of media devices, according to embodiments of the present disclosure. Various elements of FIG. 2 may include those that implement components of FIG. 1. The system may include a media error server 230 communicatively coupled to any suitable number of media servers 200. Media error server 230 and media servers 200 may be implemented in any suitable manner, such as by analog circuitry, digital circuitry, instructions for execution by a processor, or any suitable combination thereof. Media servers 200 may implement, fully or in part, server 100 of FIG. 1, or vice-versa.

A media error server 230 may communicate with any suitable number and kind of media servers 200. Each media error server 230 may be configured to perform error collection, error analysis, and error alerting. Moreover, each media server 200 may be configured to perform error collection, error analysis, and error altering.

An SDS application 128 in each media server 200 may be executed on a SOC such as SOC 124 (not shown) and an operating system such as operating system 126 (not shown). SDS application 128 may be configured to use storage media devices 110 as part of its execution. SDS application 128 may perform data integrity checks to ensure the data read from storage media devices 110 matches the data written to storage media devices 110. The data integrity checks may include error checks, hashing and erasure encoding. When a read data error occurs, SDS application 128 may store a record of the failure event in SDS performance data 132. Furthermore, if SDS application 128 detects performance parameters that do not meet established limits, it can log an error in SDS performance data 132. An error collection application 216 can extract errors from SDS performance data 132 that are to be used for media failure predictions. Once collected, error reporting application 218 may transfer these errors to media error server 230 using any suitable network connection or other mechanism. The error data may be received by a media error aggregation application in media error server 230. This application may collect error data from a plurality of media servers 200. The aggregation may include a database specifically designed for error collection. This may give a large sample of error data from multiple media servers 200.

Media servers 200 may be connected to a media error server 230 using any suitable network connection, which may allow the media error analysis to be accomplished without adding any processing overhead onto media servers 200 themselves. First, data may be aggregated from multiple media servers 200 using media aggregation application 232. The errors from each individual media server 200 may be collected and aggregated. For example, error data may be collated by error type and errors may be ordered by time received. This may provide a data source for a media error analysis module 234 on error server 230.

Media failure prediction may include the task of identifying systems which are likely to fail in the future based on historical trends, data, and usage statistics collected from similar systems. Generally, a data 'training set' including media error data may be collected. A model, or series of models can be built for the purpose of providing predictive results. The training data may be used to be able to heuristically tune the model to give accurate results, such as reducing false positives and negatives. A false positive may be a prediction that a storage media device is potentially failing, when in fact it is not. A false negative may be a lack of an indication of a storage media device that is actually failing.

Since these models may be dependent upon statistical analysis over time, media error aggregation module 232 may be responsible for aligning the local timestamps from each media server error collection module 216. These may be grouped into a time interval to account for minor time differences between the servers. Media error analysis module 234 may perform this grouping. Consequently, when a specific media server 200 or storage media device 110 experiences a failure, that failure is recorded and associated with that specific media server at a particular timestamp. A failure prediction application may be trained to learn this relationship using machine learning.

Media failure prediction module 236 may analyze the data provided by media error analysis module 234 at frequent, regular intervals. Based on historical trends, data, and usage statistics collected from this data, a value for each storage media device storage media device 110 and media server 200 may be generated. This value may provide a probability of failure for each of these items.

Storage media device failure prediction has previously been performed using exclusively media monitoring and performance data attributes. Specifically, SMART attributes have been used, including those representing reallocated sectors count, reported uncorrectable errors, command timeout, current pending sector count, and uncorrectable sector count. Using solely internal storage media monitoring data attributes is limited because it exclusively considers defects occurring inside the media. For example, this medium does not include failures arising from the system interface to media devices. This limitation can be removed by adding additional media error data to improve the predictive models.

As mentioned earlier, the amount of information provided to the model will increase its accuracy and lower the number of false positives and negatives. To this end, the traditional data sources such as storage media monitoring and performance data (such as 118) and operating system performance data (such as 130) may be augmented with SDS performance data (such as 132). SDS application 128 may provide data integrity measurements, from detected errors, in addition to performance at the user data level. Another advantage may be that, by design, an SDS application is built to pseudo-randomly place data across the various storage media devices 110 and also within each storage media physical storage 112 location. This may provide a better statistical model for media failure prediction module 236 than other models. This failure prediction application may be informed by a larger amount of data collected from past historical failures, and 'trained' to reproduce the mapping from media error data to an estimated time-to-failure.

Some examples of additional media error data may include those reported by a SDS application 128 such as summary statistics like data throughput rate, file system errors, user data errors, and results from automated disk check tests for throughput accuracy mentioned later. This data may be recorded in a time-series that joins a particular storage media device 110 and be timestamped together with the additional media error data as previously described above.

The failure probability for each storage media device storage media device 110, media server 200, and placement group may be provided by media failure prediction module 236 to media failure alerting module 238. The output of media failure prediction application 236 may be the estimated time to failure for a particular media storage device or media server. Devices with a shorter time to failure can be interpreted as having a greater risk footprint and are expected to fail sooner. Predictions can be performed at an arbitrary, but regular, frequency, and media storage devices which are consistently predicted to fail are more likely to fail. Predicted values can be measured against a set of predefined thresholds by media failure alerting module 238. These may be instantaneous thresholds or measurements aggregated over a specified time interval, and may include, for example, an estimated time-to-failure (TTF). Continuous assessment of time to failure of a drive—that is, the longer it is marked as potentially failing—may affect the risk value. Using this measurement, a risk footprint for each of the above-mentioned items can be produced. Further if these exceed a set threshold, then an alerting message can be sent to the specific unit with an excessive risk footprint.

The result of the data analysis may be provided to media failure prediction application 236. This may detect if a specific media device 110 in a specific media server 200 is a potentially failing device.

Media failure prediction application 236 may provide information regarding potentially failing media devices 110 to a media failure alerting application 238. Failure prediction data can be aligned to a specific storage media device 110 and media server 200. Media failure alerting application 238 may send this information to the respective media server 200 using an external network connection or any other suitable communication protocol. A corresponding application, media failure alerting application 224, may be included in each media server 200. The local media failure alerting application 224 may trigger any suitable corrective actions or sets of responses based upon the information that it has received. For example, media failure remediation application 222 may alert users or administrators that an error is likely to occur. Application 222 may set various elements of a media failure display 220, such as LCDs, LEDs, or other displays with error codes or any suitable indicator than error has occurred, on the outside of the respective server.

Figure 3:
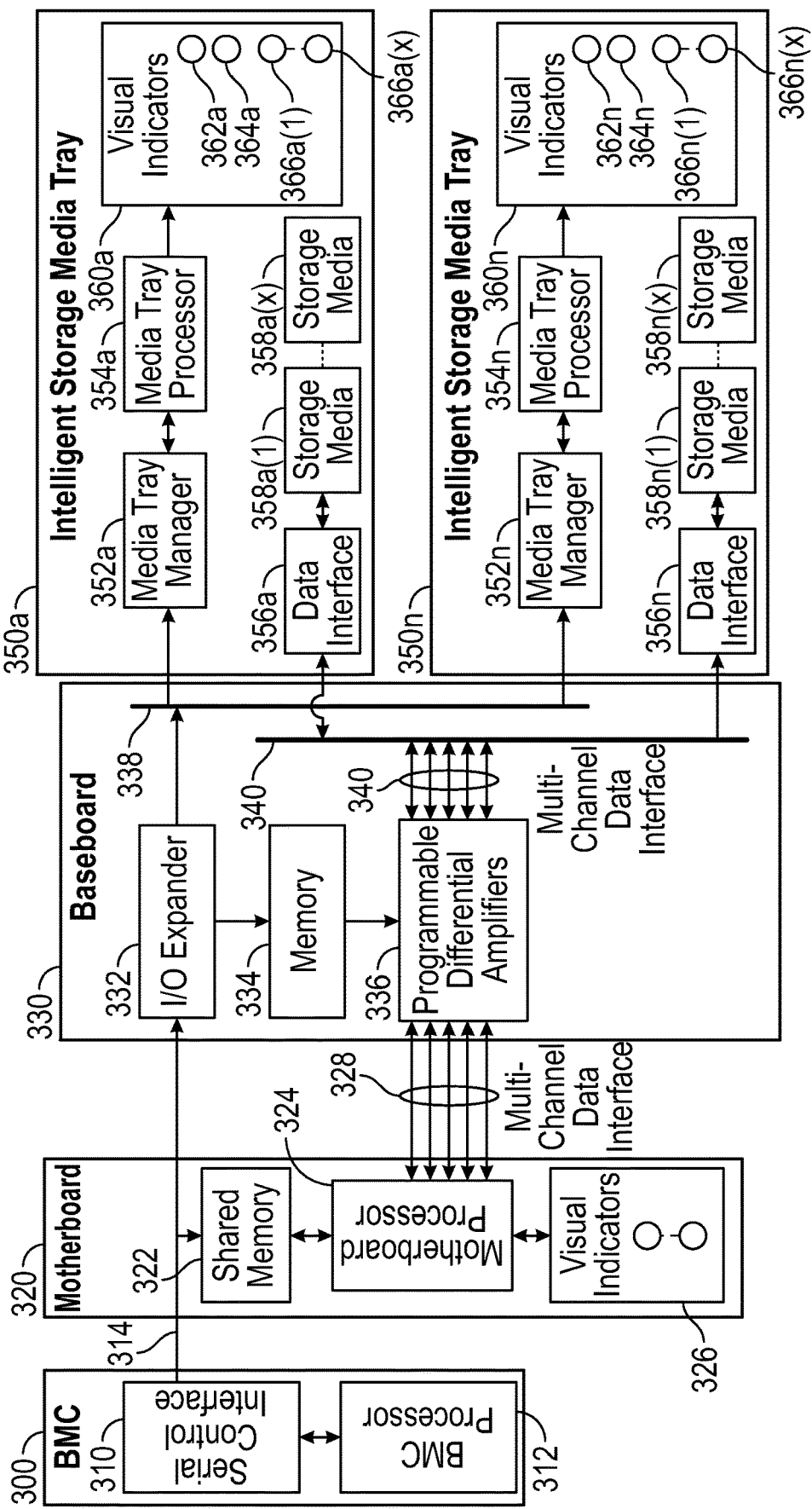
FIG. 3 is an illustration of an example system architecture of a storage server, according to embodiments of the present disclosure.

FIG. 3 is an illustration of an example system architecture of a storage server, according to embodiments of the present disclosure. The storage server may implement fully or in part, for example, servers 100 or 200, or vice-versa. The storage server may include any suitable number and kind of components, including a baseboard management controller (BMC) 300, motherboard 320, baseboard 330, and plurality of intelligent storage media trays 350. BMC 300 may be implemented in any suitable manner, such as instructions for execution by a processor, analog circuitry, digital circuitry, control logic, digital logic circuits programmed through hardware description language, application specific integrated circuits (ASIC), field programmable gate arrays (FPGA), programmable logic devices (PLD), or any suitable combination thereof, whether in a unitary device or spread over several devices. These may be implemented by instructions for execution by a processor through, for example, a function, application programming interface (API) call, script, program, compiled code, interpreted code, binary, executable, executable file, firmware, object file, container, assembly code, or object.

Intelligent storage media trays 350 may contain storage media 358, which may connect to baseboard 330 via a data interface 356 and multi-channel data interface 340. These interfaces can supply data, but also collect error information such as media performance and monitoring data. A media tray manager 352 may be implemented using a media tray processor 354 to control a set of visual indicators 360. These indicators 360 may be used to display the current status of intelligent storage media tray 350 and the respective storage media 358. Information may be provided to media tray manager 352 to define the status of the intelligent storage media tray 350 and storage media 358.

Baseboard 330 may contain programmable differential amplifiers 336 to create multi-channel data interface 340. This can contain individual data interfaces for each of the storage media devices 358. Programmable differential amplifiers 336 can be programmed via a serial control interface 314 using I/O expander 332. Using this programming the output signals and the input levels can be modified. Default levels can be stored in memory 334 on baseboard 330. Using I/O expander 332, baseboard 330 may provide an expanded serial control interface 338 to the intelligent storage media trays 350.

Motherboard 320 may contain a motherboard processor 324. This processor may execute the previously define operations such as the SDS application 128, SDS performance data 132, error collection 216, error reporting 218, media failure alerting 224, media failure verification 222, and medial failure display 220. It may also provide multi-channel data interface 328 to baseboard 330. A shared memory 322 may be connected to the serial control interface 314. A set of visual indicators 326 may be used to externally display server status.

BMC 300 may include a BMC processor 312. This can control other system components via a serial interface controller 310 which generates serial control interface 314. Serial interface 314 may connect BMC processor 312 to shared memory 322. Information in the shared memory can be accessed by both BMC processor 312 and motherboard processor 324.

In the implementation of FIG. 3, motherboard processor 324 may implement SoC 124; intelligent storage media trays 350 may implement media servers 200 or storage media devices 110; and baseboard 330 may implement baseboard 122.

Once a media failure alert has been received by the media failing alerting application 224, then motherboard processor 324 may begin a media failure verification process 222. This is discussed in more detail below within the context of FIG. 4.

Applications and modules 128, 216, 218, 222, 224, 232, 234, 236, 238, 114, 126, 134, 352 may be implemented by instructions for execution by a processor, analog circuitry, digital circuitry, control logic, digital logic circuits programmed through hardware description language, application specific integrated circuits (ASIC), field programmable gate arrays (FPGA), programmable logic devices (PLD), or any suitable combination thereof, whether in a unitary device or spread over several devices. These may be implemented by instructions for execution by a processor through, for example, a function, application programming interface (API) call, script, program, compiled code, interpreted code, binary, executable, executable file, firmware, object file, container, assembly code, or object.

Figure 4:
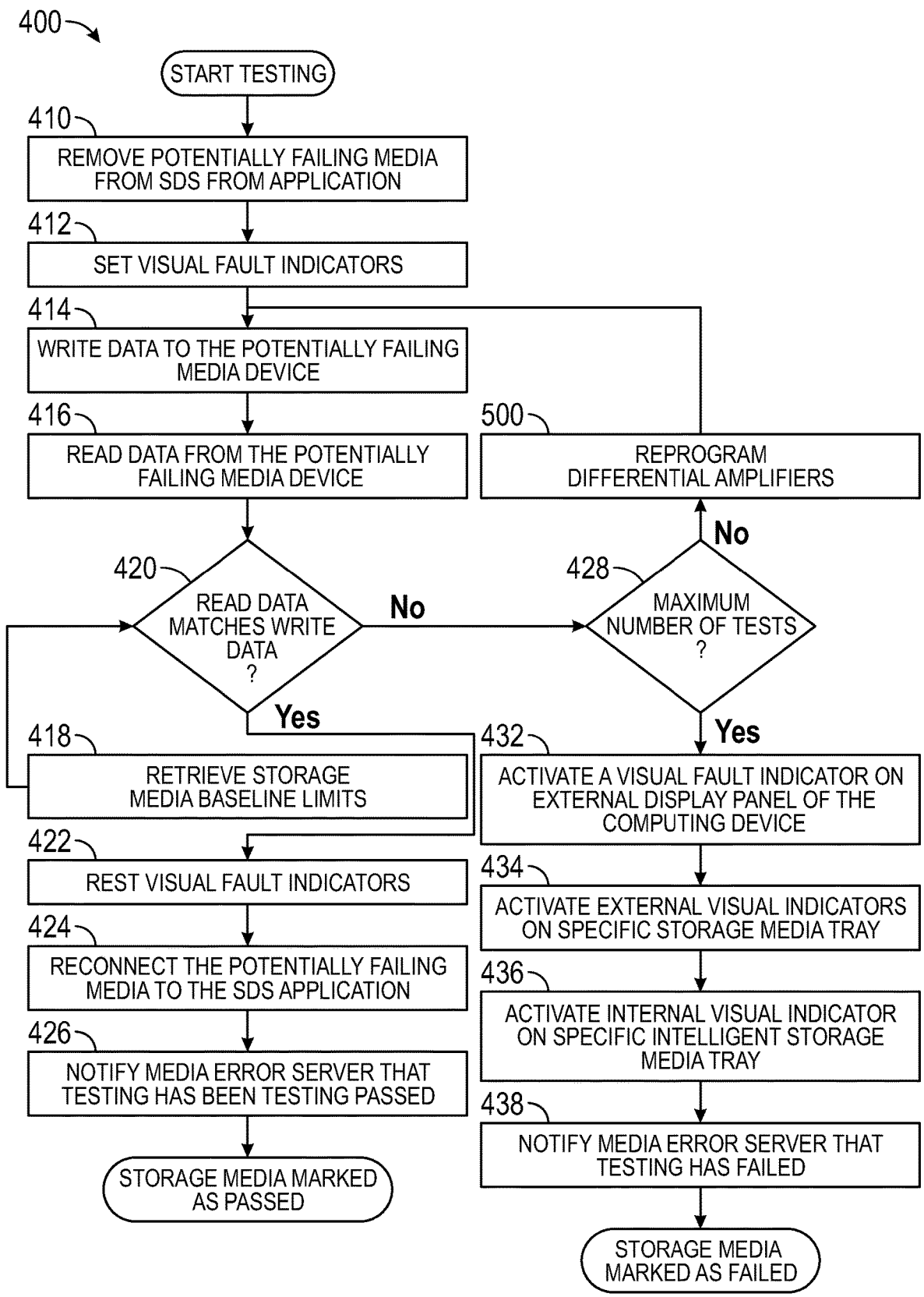
FIG. 4 is an illustration of a data error rate measurement flow chart, according to embodiments of the present disclosure.

FIG. 4 is an illustration of a data error rate measurement method 400, according to embodiments of the present disclosure.

At block 410, a potentially failing media device such as device 358 (or device 110) may have already been identified. The potentially failing media device 358 may be detached from SDS application 128 but may otherwise remain attached to the rest of the system for testing. From a practical perspective, since FIG. 4 illustrates this is a destructive test, all user data may have previously been securely removed from device 358 and sent to other storage devices. The first step may be to remove the object storage software of the potentially failing media device 358 and any associated storage media from the cluster of storage media devices that are in use by SDS application 128. This may be achieved by operating system 126 sending a command to SDS application 128 containing the object storage software (OSD). This may include, for example, a ceph osd out {osd-num} value where osd-num is the number of the OSD software assigned to the storage media device. The OSD can then be disconnected from SDS application 128. SDS application 128 may acknowledge that the OSD has been disconnected and that the storage media device associated with the OSD can be removed. Once SDS application 128 has acknowledged that the storage media of storage media device 358 that is potentially failing has been removed, SDS application 128 may begin re-balancing the cluster of storage media devices and copying the data from potentially failing storage media device 358 that will be detached from SDS application 128. The status of potentially failing storage media device 358 that is being removed can be monitored. SDS application 128 may signal when the state has been reached wherein all of the data from potentially failing storage media device 358 has been copied to other memory devices. Once this state has been reached, the object storage software for the potentially failing storage media device 358 can be stopped and removed. At this point the potentially failing storage media device 358 may be considered to be detached.

At block 412, external visual indicators 326 and indicators 360 for the specific intelligent storage media tray 350 are set to indicate that a specific potentially failing storage media 358 therein is isolated and detached from SDS application 128 and is undergoing testing.

At block 414, once the potentially failing storage media device 358 has been detached from SDS application 128, motherboard processor 324, as part of media failure verification process 222, may send test data to programmable differential amplifiers 336 via multi-channel data interface 328. Programmable differential amplifiers 336, using the currently programmed levels and multi-channel 340, may send the data to the respective intelligent storage media tray 350 that contains the potentially failing storage media device 358. This test data may be passed through data interface 356 to the potentially failing storage media device 358 and stored.

At block 416, motherboard processor 324 may then read the data from the potentially failing storage media devices 358 via data interface 356, multi-channel data interface 340, and programmable differential amplifiers 336 (using the receive differential amplifiers for the specific storage media device and multi-channel data interface 328).

At block 418, motherboard processor 324 may retrieve a set of threshold limits for the specific storage media device 358. This may include a threshold for the data integrity testing and also the maximum number of tests that can be executed.

At block 420, motherboard processor 324 can then compare the data sent to the potentially failing storage media devices 358 to the received data and determine the data integrity value of the transfer. This comparison may include direct evaluation of quantized input data against output data, e.g., a bit error rate, or using bulk methods such as comparing hashing values for the input and output data. This data integrity value may be compared to a previously defined threshold value obtained in block 418. If the data integrity value is outside that threshold, then block 428 may be executed, otherwise block 422 may be executed.

At block 422, the potentially failing storage media device 358 has passed the data integrity test and any baseboard tuning that has been programmed from, for example, execution of step 500 (discussed in more detail below), may then be stored. External visual indicators 326 and indicators 360 for the specific intelligent storage media tray 350 may be set to indicate that a specific potentially failing storage media 358 has completed testing, but the storage media is still identified as potentially failing until the status is changed by media failure prediction module 236.

At block 424, the potentially failing media device 358 may be reattached to SDS application 128.

At block 426, motherboard processor 324, using error reporting application 218, may notify media error server 230 that the testing has been completed. This may conclude the data testing. The passing result of the data integrity test may be used in media failing production application 236 to adjust the failure prediction for that specific storage media device 358. For example, media failing production application 236 can keep a count of the number of times a specific set of differential amplifiers (associated with potentially failing storage media device 358) have been reprogrammed. An alert can be sent if this number is above a predefined value as it may indicate a failing differential amplifier component. Further, the new configuration could be compared to other differential amplifier adjustments that have been made. If there is a trend that many of the same configurations of differential amplifies across multiple servers have required adjustment, an alert could be sent to indicate the original production settings may need to be reevaluated or adjusted.

At block 428, motherboard processor 324 may determine if a maximum number of data integrity tests, such as 100 or less, measured against the value acquired in block 418, has been exhausted. If the limit has been exhausted, then block 432 may be executed next. If not, block 430 may be executed next.

At block 500, differential amplifiers may be reprogrammed to alter contents to be written for a subsequent test. This may include, for example, loading a message into shared memory 322. This message may include instructions to change the levels in the programmable differential amplifiers 336. The algorithm used to derive the instructions may be illustrated in FIGS. 6A and 6B, discussed in more detail below. BMC processor 312 can retrieve these instructions from shared memory 322 via serial control interface 314 using serial interface controller 310. BMC processor 312 may then set new levels into programmable differential amplifiers 336 based on those instructions using serial interface controller 310 to connect via serial control interface 314 and I/O expander 332. Once set, BMC processor 312 may notify motherboard processor 324 using shared memory 322. Motherboard processor 324 may then execute block 414 and commence another data integrity testing loop. The testing loop may continue until either the data integrity value falls below the threshold or the maximum number of tests is reached.

At block 432, a visual fault indicator 326 on external display panel of the computing device may be set to indicate that a specific potentially failing storage media device 358 has failed data integrity testing and needs attention.

At block 434, external visual indicators 360, 362, 364, 366 on specific storage media trays 350 may be activated. Visual indicator 362 may indicate that a data integrity test is complete and a specific potentially failing storage media device 358 has failed. Visual indicator 364 may indicate that intelligent storage media tray 350 can be removed from the server for any further actions.

At block 436, an internal visual indicator on specific intelligent storage media tray for the specific potentially failing storage media device 358 may be set to show that it has failed data error rate testing and can be removed from the server for any further actions. This may conclude the data testing.

At block 438, motherboard processor 324, using error reporting application 218 may notify media error server 230 that the testing has failed. This may conclude the data testing. The failing result of the data integrity test may be used in media failing prediction application 236 to adjust the failure prediction algorithm for future predictions. The failing result may include the comparison data obtained in block 420.

Figure 5:
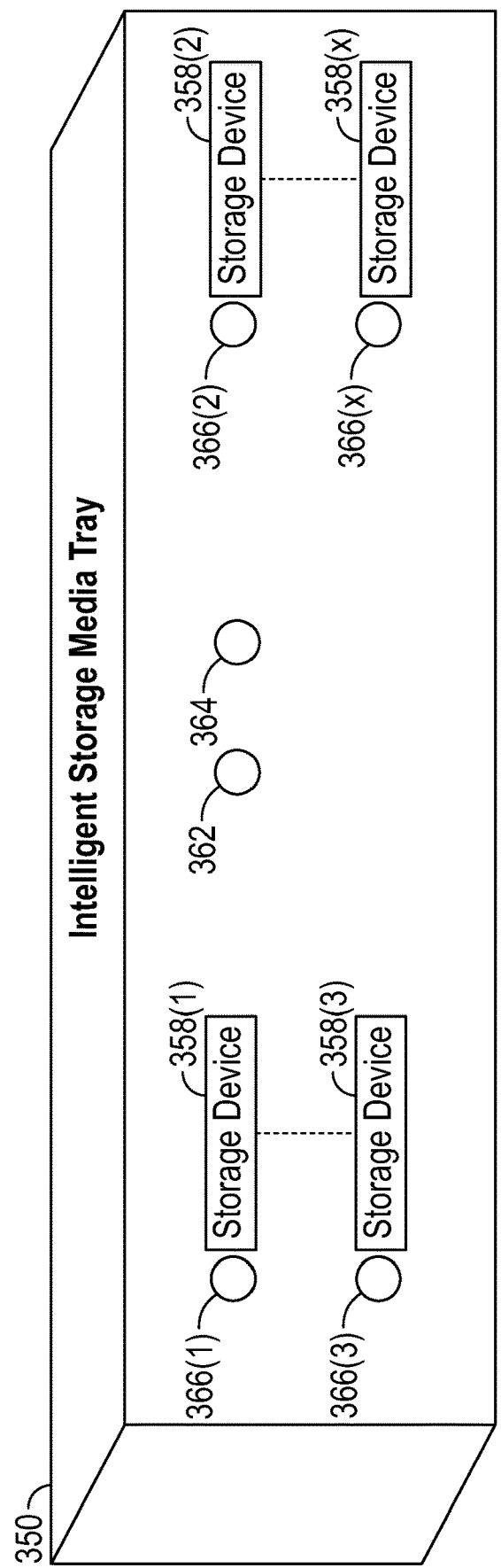
FIG. 5 is a physical representation of an intelligent storage media tray, according to embodiments of the present disclosure.

FIG. 5 is a physical representation of an intelligent storage media tray 350, according to embodiments of the present disclosure.

FIG. 5 shows various visual indicators and storage media. As mentioned earlier the respective media tray manager 352 (not shown) may set visual indicators 360 using media tray processor 354 (not shown). As a result of the previous testing, these indicators may be set as follows. Visual indicator 362 may indicate that a bit error rate test is in progress (block 412), or has failed (block 432), or has passed (block 422). Visual indicator 364 may indicate that intelligent storage media tray 350 cannot be removed from the server, (block 412 and block 422) or that it can be removed from the server (block 434). Visual indicators 366 may indicate which storage device 358 is undergoing testing or has failed (block 432) or has passed (block 422). Since the indicator is positioned adjacent to the storage media, the specific indicator will identify which specific storage device 358 that is affected.

Using the visual indicators 326, 362, 364, and 366 a technician can immediately be alerted to the ongoing testing and verification processes. Visual indicators 360, 326, 362, 364, 366 may be implemented by any suitable mechanism, such as LEDs, LCDs, or display screens.

Figure 6A:
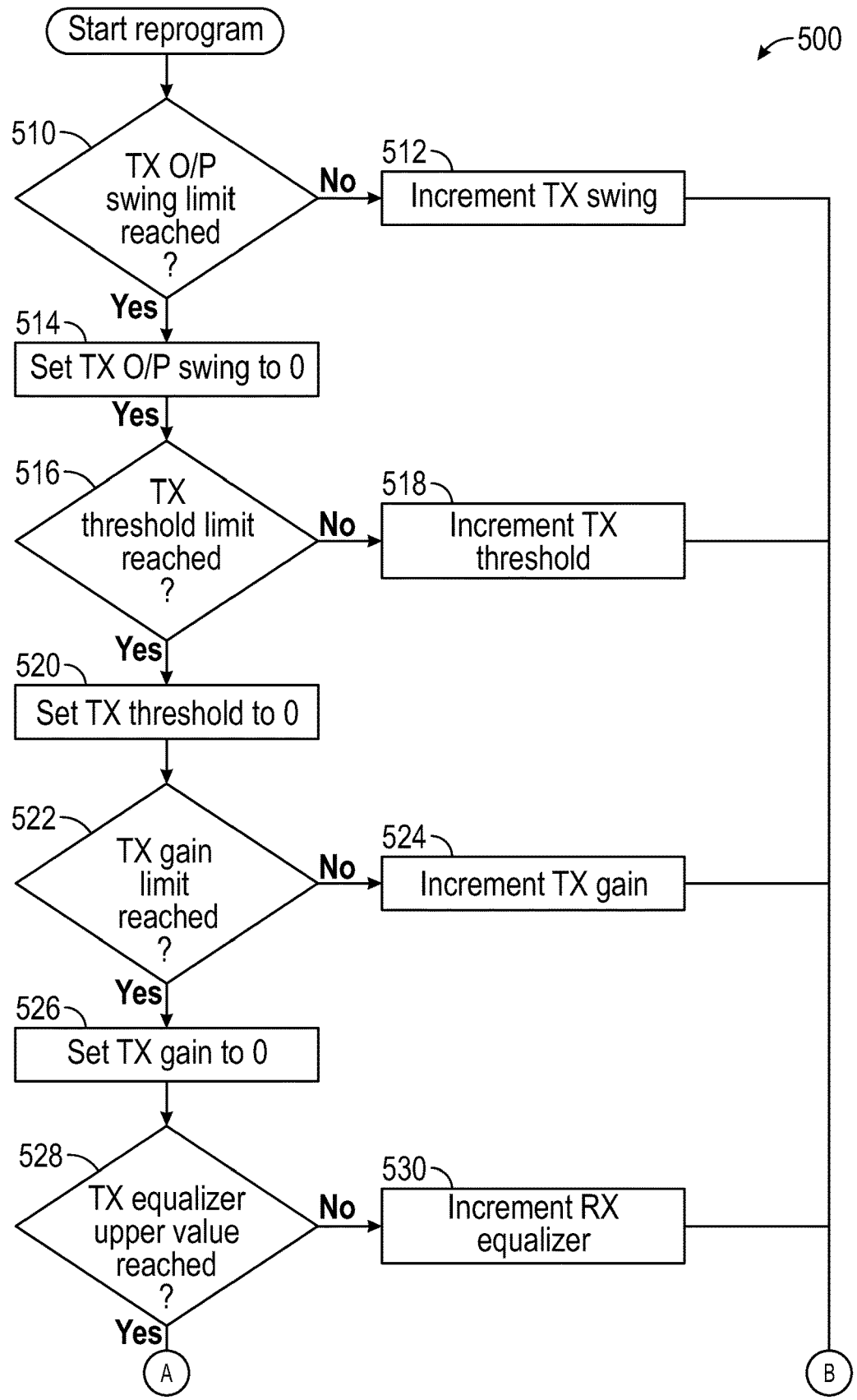
FIGS. 6A and 6B are an illustration of a differential amplifier configuration algorithm, according to embodiments of the present disclosure.
Figure 6B:
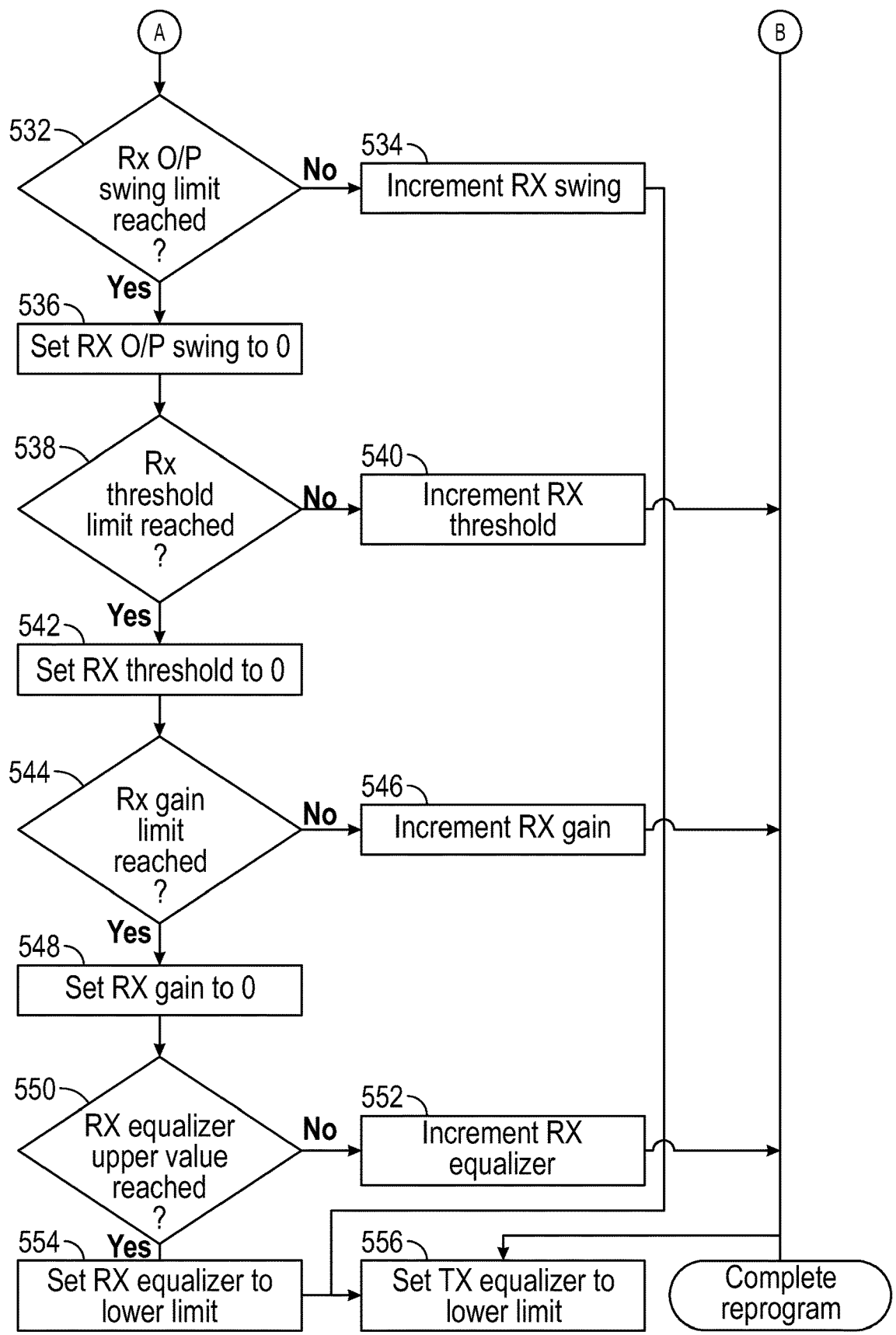

FIGS. 6A and 6B are an illustration of a differential amplifier configuration algorithm, according to embodiments of the present disclosure. FIGS. 6A and 6B may implement block 500 from FIG. 4. FIGS. 6A and 6B illustrate an algorithm for generating the data to program differential amplifiers 336. As seen in FIG. 3, differential amplifiers 336 may provide data to and receive data from storage media devices 358. The configuration algorithm is given for a digitally controlled differential amplifier with one or more of a receiver equalizer, flat gain, signal detect threshold level, and output swing. These can be changed for both transmit and receive differential amplifiers. Since the testing defined in FIG. 4 utilizes writing data, transmittal, reading data, and reception, both sets of differential amplifiers may be evaluated.

The algorithm shown in FIGS. 6A and 6B may vary the settings of the transmit (TX) differential amplifier for a single version of the receiver (RX) settings. The RX settings are incremented, and the TX settings are linearly cycled through a range of settings for that RX configuration. In this manner the possible permutations of a range of RX and TX settings can be tested against each other. For each of these pairs of settings, a data integrity test may be performed as discussed above in FIG. 4, and the result recorded.

The limits used in this algorithm may be extracted from the storage media baseline limits retrieved in block 418. These limits may be dependent on the media device type that has been identified and is being tested. Each media device type may have its own set of parameters.

At block 510, the current TX output voltage swing value may be compared to the TX output voltage swing limit retrieved in block 418. If the limit has been reached, then block 514 may be executed next. Otherwise, block 512 may be executed.

At block 512, the TX output voltage swing value may be incremented. This can be a simple linear increment, as shown later, or can be a more complex adjustment.

At block 514, the TX output voltage swing value may be set to 0. Alternatively, a minimum value can be obtained from the limits retrieved in block 418.

At block 516, the current TX input voltage threshold value may be compared to the TX input voltage threshold limit retrieved in block 418. If the limit has been reached, then block 520 may be executed next. Otherwise, block 518 may be executed.

At block 518, the TX input voltage threshold value may be incremented. This can be a simple linear increment, as shown later, or can be a more complex adjustment.

At block 520, the TX input voltage threshold value may be set to 0. Alternatively, a minimum value can be obtained from the limits retrieved in block 418.

At block 522, the current TX input voltage gain value may be compared to the TX input voltage gain limit retrieved in block 418. If the limit has been reached, then block 526 may be executed next. Otherwise, block 524 may be executed.

At block 524, the TX input voltage gain value may be incremented. This can be a simple linear increment, as shown later, or can be a more complex adjustment.

At block 526 the TX input voltage gain value may be set to 0. Alternatively, a minimum value can be obtained from the limits retrieved in block 418.

At block 528, the current TX input equalizer value may be compared to the TX input equalizer limit retrieved in block 418. If the limit has been reached, then block 532 may be executed next. Otherwise, block 530 may be executed.

At block 530, the TX input equalizer value may be incremented. This can be a simple linear increment, as shown later, or can be a more complex adjustment.

At block 532, the TX input equalizer value may be set to 0. Alternatively, a minimum value can be obtained from the limits retrieved in block 418.

Note, at this point the loop of blocks 510 through 530 may have cycled through the various TX differential amplifier values and a new RX differential amplifier value can be programmed.

At block 532, the current RX output voltage swing value may be compared to the RX output voltage swing limit retrieved in block 418. If the limit has been reached, then block 536 may be executed next. Otherwise, block 534 may be executed.

At block 534, the RX output voltage swing value may be incremented. This can be a simple linear increment, as shown later, or can be a more complex adjustment. Block 556 may be executed next.

At block 536, the RX output voltage swing value may be set to 0. Alternatively, a minimum value can be obtained from the limits retrieved in block 418.

At block 538, the current RX input voltage threshold value may be compared to the RX input voltage threshold limit retrieved in block 418. If the limit has been reached, then block 542 may be executed next. Otherwise, block 540 may be executed.

At block 540, the RX input voltage threshold value may be incremented. This can be a simple linear increment, as shown later, or can be a more complex adjustment. Block 556 may be executed next.

At block 542, the RX input voltage threshold value may be set to 0. Alternatively, a minimum value can be obtained from the limits retrieved in block 418.

At block 544 the current RX input voltage gain value may be compared to the RX input voltage gain limit retrieved in block 418. If the limit has been reached, then block 548 may be executed next. Otherwise, block 546 may be executed.

At block 546, the RX input voltage gain value may be incremented. This can be a simple linear increment, as shown later, or can be a more complex adjustment. Block 556 may be executed next.

At block 548, the RX input voltage gain value may be set to 0. Alternatively, a minimum value can be obtained from the limits retrieved in block 418.

At block 550, the current TX input equalizer value may be compared to the RX input equalizer limit retrieved in block 418. If the limit has been reached, then block 554 may be executed next. Otherwise, block 552 may be executed.

At block 552, the RX input equalizer value may be incremented. This can be a simple linear increment, as shown later, or can be a more complex adjustment. Block 556 may be executed next.

At block 554, the RX input equalizer value may be set to a lower limit value retrieved from the limits obtained in FIG. 4, block 418. Block 556 may be executed next.

At block 556, the TX input equalizer value may be set to a lower limit value retrieved from the limits retrieved in FIG. 4 block 418. Note, this may begin the loop of blocks 510 through 530 that will cycle through the various TX differential amplifier values starting with this lower limit.

TABLE 1

Example of TX differential amplifier configuration values for RX = 010100000

| EQ3 | EQ2 | EQ1 | EQ0 | FG1 | FG0 | TH1 | TH0 | SW0 | Disk Errors |
|---|---|---|---|---|---|---|---|---|---|
| 0 | 1 | 0 | 1 | 0 | 0 | 0 | 0 | 0 | 4 |
| 0 | 1 | 0 | 1 | 0 | 0 | 0 | 0 | 1 | 4 |
| 0 | 1 | 0 | 1 | 0 | 0 | 0 | 1 | 0 | 4 |
| 0 | 1 | 0 | 1 | 0 | 0 | 0 | 1 | 1 | 4 |
| 0 | 1 | 0 | 1 | 0 | 0 | 1 | 0 | 0 | 4 |
| 0 | 1 | 0 | 1 | 0 | 0 | 1 | 0 | 1 | 3 |
| 0 | 1 | 0 | 1 | 0 | 0 | 1 | 1 | 0 | 4 |
| 0 | 1 | 0 | 1 | 0 | 0 | 1 | 1 | 1 | 3 |
| 0 | 1 | 0 | 1 | 0 | 1 | 0 | 0 | 0 | 4 |
| 0 | 1 | 0 | 1 | 0 | 1 | 0 | 0 | 1 | 3 |
| 0 | 1 | 0 | 1 | 0 | 1 | 0 | 1 | 0 | 4 |
| 0 | 1 | 0 | 1 | 0 | 1 | 0 | 1 | 1 | 3 |
| 0 | 1 | 0 | 1 | 0 | 1 | 1 | 0 | 0 | 3 |
| 0 | 1 | 0 | 1 | 0 | 1 | 1 | 0 | 1 | 3 |
| 0 | 1 | 0 | 1 | 0 | 1 | 1 | 1 | 0 | 2 |
| 0 | 1 | 0 | 1 | 0 | 1 | 1 | 1 | 1 | 3 |
| 0 | 1 | 0 | 1 | 1 | 0 | 0 | 0 | 0 | 2 |
| 0 | 1 | 0 | 1 | 1 | 0 | 0 | 0 | 1 | 2 |
| 0 | 1 | 0 | 1 | 1 | 0 | 0 | 1 | 0 | 2 |
| 0 | 1 | 0 | 1 | 1 | 0 | 0 | 1 | 1 | 2 |
| 0 | 1 | 0 | 1 | 1 | 0 | 1 | 0 | 0 | 1 |
| 0 | 1 | 0 | 1 | 1 | 0 | 1 | 0 | 1 | 1 |
| 0 | 1 | 0 | 1 | 1 | 0 | 1 | 1 | 0 | 1 |
| 0 | 1 | 0 | 1 | 1 | 0 | 1 | 1 | 1 | 1 |
| 0 | 1 | 0 | 1 | 1 | 1 | 0 | 0 | 0 | 1 |
| 0 | 1 | 0 | 1 | 1 | 1 | 0 | 0 | 1 | 1 |
| 0 | 1 | 0 | 1 | 1 | 1 | 0 | 1 | 0 | 0 |

TABLE 1 is an example of the TX differential amplifier configuration values that result from the previous algorithm in FIGS. 6A and 6B. For simplicity, only one set of equalizer values are shown. The column heading are as follows:

TABLE 2

| Heading | Description |
|---|---|
| | Differential amplifier configuration value categories |
| EQ3-EQ0 | This may provide 16 settings for the input equalizer and give various gain levels for a specific set of frequencies. |
| FG1-FG0 | A flat gain adjustment that is frequency independent. This can be set to one of 4 values |
| TH1-TH0 | May set the thresholds to detect the binary transitions in the input stream. 4 sets of threshold levels can be set. |
| SW1 | May sets the output swing of the differential amplifier. One of two levels can be selected |
| Disk Errors | As shown in FIG. 4 blocks 414, 416, data may be written to and read from a storage media device. At FIG. 4, step 418 the read values may be compared to the written ones. The number of errors maybe recorded for each configuration. |

It can be seen from TABLE 1 that as the differential amplifier values are changed the change values may influence the integrity of the data written to or from the storage media device. Therefore, it can be shown that a false positive can be generated due to improper settings in the differential amplifiers. These may be manifested in, for example, the errors seen in the SDS performance data 132, and these may be due to these settings rather than a failing storage media device.

Moreover, the results of Sheet 1 may be repeated for other values of EQ3-EQ0, such as the sets of data of {0 0 0 0}, {0 0 0 1}. {0 0 1 0}, {0 0 1 1}, {0 0 1 1}, {0 1 0 0}, {0 1 1 0}, {0 1 1 1}, {1 0 1 0 0}, {1 1 0 1}, {1 1 1 0}, {1 1 1 1}.

Embodiments of the present disclosure may include a media failure server. The server may include a processor and a non-transitory machine-readable medium including instructions, the instructions, when loaded and executed by the processor, cause the processor to aggregate SDS performance data from a plurality of media servers, process the aggregated SDS performance data, and determine whether the aggregate SDS performance data indicates that a first media server includes a potentially failing storage medium.

In combination with any of the above embodiments, the instructions may be further to cause the processor to determine whether SDS performance data from the first media server as compared to the aggregate SDS performance data indicates that the first media server includes a potentially failing storage medium.

In combination with any of the above embodiments, the instructions may be further to cause the processor to further analyze the first media server to verify whether the first media server includes a potentially failing storage medium by characterizing an interface to the potentially failing storage medium.

In combination with any of the above embodiments, the instructions may be further to cause the processor to characterize the interface to the potentially failing storage medium by tuning an active backplane to the potentially failing storage medium.

In combination with any of the above embodiments, the instructions may be further to cause the processor to tune the active backplane to the potentially failing storage medium by determining differential amplifier configurations that reduce errors in the potentially failing storage medium.

In combination with any of the above embodiments, the instructions may be further to cause the processor to use the characterizations of the interface to the potentially failing storage medium to verify whether the potentially failing storage medium is still to be considered to be potentially failing.

In combination with any of the above embodiments, the instructions may be further to cause the processor to track adjustments of differential amplifiers in response to a prediction of failure for a storage media device, compare the adjustments of differential amplifiers against other adjustments of differential amplifiers, and, based on the comparison of the adjustment against other adjustments, determine that original production settings are to be recalibrated.

In combination with any of the above embodiments, the determination of whether the aggregate SDS performance data may indicate that the first media server includes the potentially failing storage medium is a preliminary determination made while the potentially failing storage medium is included in the SDS. The instructions may be further to cause the processor to, based upon the preliminary determination, disconnect communication between the potentially failing storage medium and the SDS while maintaining physical connection between the potentially failing storage medium and the SDS, and conduct additional testing of the potentially failing storage medium.

In combination with any of the above embodiments, the server may further include a baseboard management control circuit configured to conduct the additional testing of the potentially failing storage medium in an out-of-band manner with respect to the SDS.

The baseboard management control circuit may be implemented in any suitable manner, such as instructions for execution by a processor, analog circuitry, digital circuitry, control logic, digital logic circuits programmed through hardware description language, application specific integrated circuits, field programmable gate arrays, PLD, or any suitable combination thereof, whether in a unitary device or spread over several devices.

Although example embodiments have been described above, other variations and embodiments may be made from this disclosure without departing from the spirit and scope of these embodiments.

We claim:

1. A media failure server, comprising:
a processor; and
a non-transitory machine-readable medium including instructions, the instructions, when loaded and executed by the processor, cause the processor to:
aggregate software defined storage (SDS) performance data from a plurality of media servers;
process the aggregated SDS performance data;
determine whether the aggregate SDS performance data indicates that a first media server includes a potentially failing storage medium; and
based on a determination that the first media server includes a potentially failing storage medium, characterize and adjust an interface to the potentially failing storage medium by tuning an active backplane to the potentially failing storage medium, the tuning of the active backplane to the potentially failing storage medium to include determination and selection of differential amplifier configurations that reduce data value errors in the potentially failing storage medium by evaluating data value error variation caused by different differential amplifier configurations.

2. The media failure server of claim 1, wherein the instructions are further to cause the processor to determine whether SDS performance data from the first media server as compared to the aggregate SDS performance data indicates that the first media server includes a potentially failing storage medium.

3. The media failure server of claim 1, wherein the instructions are further to cause the processor to use the characterizations of the interface to the potentially failing storage medium to verify whether the potentially failing storage medium is still to be considered to be potentially failing.

4. The media failure server of claim 1, wherein the instructions are further to cause the processor to:
track adjustments of differential amplifiers in response to a prediction of failure for a storage media device;
compare the adjustments of differential amplifiers against other adjustments of differential amplifiers; and
based on the comparison of the adjustment against other adjustments, determine that original production settings are to be recalibrated.

5. The media failure server of claim 1, wherein:
the determination whether the aggregate SDS performance data indicates that the first media server includes the potentially failing storage medium is a preliminary determination made while the potentially failing storage medium is included in the SDS;
the instructions are further to cause the processor to:
based upon the preliminary determination, disconnect communication between the potentially failing storage medium and the SDS while maintaining physical connection between the potentially failing storage medium and the SDS; and
conduct additional testing of the potentially failing storage medium.

6. The media failure server of claim 5, further comprising a baseboard management control circuit configured to conduct the additional testing of the potentially failing storage medium in an out-of-band manner with respect to the SDS.

7. A method, comprising:
aggregating software defined storage (SDS) performance data from a plurality of media servers;
processing the aggregated SDS performance data;
determining whether the aggregate SDS performance data indicates that a first media server includes a potentially failing storage medium; and
based on a determination that the first media server includes a potentially failing storage medium, characterizing and adjusting an interface to the potentially failing storage medium by tuning an active backplane to the potentially failing storage medium, the tuning of the active backplane to the potentially failing storage medium to include determination and selection of differential amplifier configurations that reduce data value errors in the potentially failing storage medium by evaluating data value error variation caused by different differential amplifier configurations.

8. The method of claim 7, comprising determining whether SDS performance data from the first media server as compared to the aggregate SDS performance data indicates that the first media server includes a potentially failing storage medium.

9. The method of claim 8, comprising using the characterizations of the interface to the potentially failing storage medium to verify whether the potentially failing storage medium is still to be considered to be potentially failing.

10. The method of claim 7, comprising:
tracking adjustments of differential amplifiers in response to a prediction of failure for a storage media device;

comparing the adjustments of differential amplifiers against other adjustments of differential amplifiers; and based on the comparison of the adjustment against other adjustments, determining that original production settings are to be recalibrated.

11. The method of claim 7, wherein:

the determination whether the aggregate SDS performance data indicates that the first media server includes the potentially failing storage medium is a preliminary determination made while the potentially failing storage medium is included in the SDS; and the method comprises:

based upon the preliminary determination, disconnecting communication between the potentially failing storage medium and the SDS while maintaining physical connection between the potentially failing storage medium and the SDS; and conducting additional testing of the potentially failing storage medium.

12. The method of claim 7, further comprising, with a baseboard management control circuit, conducting the additional testing of the potentially failing storage medium in an out-of-band manner with respect to the SDS.

13. An article of manufacture, comprising a non-transitory machine-readable medium comprising instructions, the instructions, when loaded and executed, cause a processor to:

aggregate software defined storage (SDS) performance data from a plurality of media servers;

process the aggregated SDS performance data;

determine whether the aggregate SDS performance data indicates that a first media server includes a potentially failing storage medium; and based on a determination that the first media server includes a potentially failing storage medium, characterize and adjust an interface to the potentially failing storage medium by tuning an active backplane to the potentially failing storage medium, the tuning of the active backplane to the potentially failing storage medium to include determination and selection of differential amplifier configurations that reduce data value errors in the potentially failing storage medium by evaluating data value error variation caused by different differential amplifier configurations.

14. The article of claim 13, comprising instructions to cause the processor to determine whether SDS performance data from the first media server as compared to the aggregate SDS performance data indicates that the first media server includes a potentially failing storage medium.

15. The article of claim 13, comprising instructions to cause the processor to use the characterizations of the interface to the potentially failing storage medium to verify whether the potentially failing storage medium is still to be considered to be potentially failing.

16. The article of claim 13, comprising instructions to cause the processor to:

track adjustments of differential amplifiers in response to a prediction of failure for a storage media device;

compare the adjustments of differential amplifiers against other adjustments of differential amplifiers; and based on the comparison of the adjustment against other adjustments, determine that original production settings are to be recalibrated.

17. The article of claim 13, wherein:

the determination whether the aggregate SDS performance data indicates that the first media server includes the potentially failing storage medium is a preliminary determination made while the potentially failing storage medium is included in the SDS; and the article comprising instructions to cause the processor to:

based upon the preliminary determination, disconnect communication between the potentially failing storage medium and the SDS while maintaining physical connection between the potentially failing storage medium and the SDS; and conduct additional testing of the potentially failing storage medium.

18. The article of claim 13, further comprising instructions to cause the processor to, with a baseboard management control circuit, conduct the additional testing of the potentially failing storage medium in an out-of-band manner with respect to the SDS.

* * * * *